United States Patent
Olsson et al.

(10) Patent No.: US 9,323,306 B2
(45) Date of Patent: Apr. 26, 2016

(54) ENERGY BASED TIME SCHEDULER FOR PARALLEL COMPUTING SYSTEM

(75) Inventors: Thomas Olsson, Karlshamn (SE); Erik Adlers, Malmö (SE); Christopher Sturk, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 2246 days.

(21) Appl. No.: 12/327,241

(22) Filed: Dec. 3, 2008

(65) Prior Publication Data

US 2010/0138837 A1     Jun. 3, 2010

(51) Int. Cl.
| | |
|---|---|
| *G06F 1/00* | (2006.01) |
| *G06F 1/26* | (2006.01) |
| *G06F 1/32* | (2006.01) |
| *G06F 11/30* | (2006.01) |
| *G06F 9/46* | (2006.01) |
| *G06F 15/173* | (2006.01) |
| *G06F 9/50* | (2006.01) |

(52) U.S. Cl.
   CPC .............. *G06F 1/3203* (2013.01); *G06F 1/329* (2013.01); *G06F 9/5027* (2013.01); *G06F 9/5094* (2013.01); *Y02B 60/142* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 5,724,591 A | 3/1998 | Hara et al. | |
| 5,752,030 A | 5/1998 | Konno et al. | |
| 6,711,447 B1 | 3/2004 | Saeed | |
| 7,100,056 B2 | 8/2006 | Barr et al. | |
| 7,111,178 B2 | 9/2006 | Rusu et al. | |
| 2005/0055590 A1 | 3/2005 | Farkas et al. | |
| 2005/0160428 A1* | 7/2005 | Ayachitula et al. | 718/104 |
| 2005/0182578 A1* | 8/2005 | Dolwin | 702/75 |
| 2006/0026447 A1 | 2/2006 | Naveh et al. | |
| 2006/0085794 A1* | 4/2006 | Yokoyama | 718/100 |
| 2006/0095807 A1 | 5/2006 | Grochowski et al. | |
| 2006/0259621 A1* | 11/2006 | Ranganathan et al. | 709/226 |
| 2007/0255929 A1 | 11/2007 | Kasahara et al. | |
| 2008/0022140 A1* | 1/2008 | Yamada et al. | 713/322 |
| 2008/0059921 A1 | 3/2008 | Esliger et al. | |
| 2008/0085717 A1* | 4/2008 | Chhabra et al. | 455/450 |
| 2008/0313640 A1* | 12/2008 | Liu et al. | 718/104 |
| 2009/0024985 A1* | 1/2009 | Hommura et al. | 717/129 |
| 2010/0037038 A1* | 2/2010 | Bieswanger et al. | 712/220 |

FOREIGN PATENT DOCUMENTS

| | | |
|---|---|---|
| JP | 2005-085164 | 3/2005 |
| WO | 2008083879 A1 | 7/2008 |

OTHER PUBLICATIONS

International Search Report for PCT/EP2009/066128 mailed Feb. 19, 2010.
Written Opinion for PCT/EP2009/066128 mailed Feb. 19, 2010.

* cited by examiner

*Primary Examiner* — Adam Lee
(74) *Attorney, Agent, or Firm* — Patent Portfolio Builders PLLC (57) ABSTRACT

A system, computer readable medium and method for reducing an energy consumption in a parallel computing system that includes plural resources. The method includes receiving a computing job to be performed by the parallel computing system, determining a number of resources of the plural resources to be used for performing the computing job by searching a preset table stored in the parallel computing system, wherein the preset table is populated prior to determining the number of resources, and distributing the computing job to the determined number of resources.

24 Claims, 7 Drawing Sheets

| COMPUTING JOB | CJ1 | CJ2 | ... | CJN |
|---|---|---|---|---|
| NO. OF RESOURCES | 3 | 5 | ... | 2 |

FIG. 3

| AVAILABLE RESOURCES | RESOURCE #1 | RESOURCE #2 | RESOURCE #3 | RESOURCE #4 | RESOURCE #5 |
|---|---|---|---|---|---|
| 1 | $V_{1,1}, f_{1,1}$ | NOT USED | NOT USED | NOT USED | NOT USED |
| 2 | $V_{1,2}, f_{1,2}$ | $V_{2,2}, f_{2,2}$ | NOT USED | NOT USED | NOT USED |
| 3 | $V_{1,3}, f_{1,3}$ | $V_{2,3}, f_{2,3}$ | $V_{3,3}, f_{3,3}$ | NOT USED | NOT USED |
| 4 | $V_{1,4}, f_{1,4}$ | $V_{2,4}, f_{2,4}$ | $V_{3,4}, f_{3,4}$ | $V_{4,4}, f_{4,4}$ | NOT USED |
| 5 | $V_{1,5}, f_{1,5}$ | $V_{2,5}, f_{2,5}$ | $V_{3,5}, f_{3,5}$ | $V_{4,5}, f_{4,5}$ | $V_{5,5}, f_{5,5}$ |

ENERGY BASED TIME SCHEDULER FOR PARALLEL COMPUTING SYSTEM

TECHNICAL FIELD

The present invention generally relates to systems, software and methods and, more particularly, to mechanisms and techniques for reducing energy consumption in a parallel computing system.

BACKGROUND

During the past years, the evolution of processors for computing devices such as computers, mobile phones, game consoles, personal digital assistants, etc., was driven by the concept of increasing the clock frequency and complexity of the chip, resulting then in an improved performance, i.e., solving computational jobs faster and in some cases more efficiently.

Recently, another concept for achieving the increase in the speed and efficiency of the processors is emerging. This new concept relies on the idea of using parallel computing to increase the system throughput without increasing the clock frequency. The idea of parallel computing is to split a problem that has to be solved, into several smaller independent problems, if possible. This split of the larger problem into smaller problems allows a system to use more than a processor and to compute simultaneously the smaller problems, in parallel, on the plural processors. According to this approach, it is possible to solve the large problem faster. Possible advantages of using multi-core architectures are flexibility and scalability.

However, by using plural processors in a single device may require higher energy consumption, as N processors are likely to use more energy than a single processor. Thus, the power consumption management of the plural processors has to be considered. The power consumption management needs also to address those situations in which some of the processors are used while the remaining processors are idle. This matter becomes more critical for mobile devices that have as the only source of energy a battery, i.e., a limited energy supply.

One way to consider the power consumption management is to reduce or temporarily turn off the voltage supply to the idle processors. However, reducing the voltage supply for an entire chip might not be possible due to performance constraints (wake-up times, etc.). Also, this technique has to consider which and how many processors to turn off and for how long, which is not an obvious task because the number of processors needed to perform a specific task depends on the specific task. For example, components of an application specific integrated circuit (ASIC) or a microprocessor have different requirements on voltage supply due to different critical paths. A critical path may be the largest amount of logic depth between two registers, where the logic depth may translate into a delay which is dependent on the supply voltage. Therefore, running some components on a lower voltage can save energy.

Furthermore, using multiple clock frequencies in a synchronous design can lead to a twofold energy saving in a multiple voltage supply environment, because decreasing the clock frequency in a complementary metal-oxide-semiconductor (CMOS) circuit makes it possible to reduce its supply voltage. Therefore, one possibility for reducing the energy consumption in a parallel computing system is scheduling techniques that provide a distribution of the computing job over the entire set of processor cores.

However, when dividing a computational job among a number of parallel computation units, instead of using a single computational unit at a higher clock frequency, N parallel units may be used at a reduced clock frequency. It is assumed that by using the N parallel units enables a clock frequency reduction by a factor N. In practice, due to overhead, it is found that the actual clock frequency reduction is less than N.

By only considering the linear relation between the dynamic power consumption and clock frequency and also considering that the parallel computation units consume more chip-area, it follows that the parallel implementation is less energy efficient than a single computation unit. However, to determine whether energy benefits exist for the parallel computation, the power consumed by the parallel computation units, due to the lower clock frequency, when using less pipeline registers and/or low-leakage transistors and/or lower supply voltage should be evaluated. Taking these factors into account, it may be shown that a parallel processor implementation can save energy compared to a single processor.

However, scheduling the processor resources in a parallel computing environment is complex because of the plurality of the existing resources, the different needs of each computing job, etc. In other words, because there are a very large number of possible combinations of the number of resources to be used and the number of the computing jobs to be performed, finding the appropriate scheduling of the resources is not a simple matter of trying a reduced number of possibilities. This challenge of finding the correct number of resources to be used for a specific computing job is problematic for the existing systems, which also makes the power consumption reduction difficult.

Accordingly, it would be desirable to provide devices, systems and methods that avoid the afore-described problems and drawbacks.

SUMMARY

According to one exemplary embodiment, there is a method for reducing an energy consumption in a parallel computing system that includes plural resources. The method includes receiving a computing job to be performed by the parallel computing system; determining a number of resources of the plural resources to be used for performing the computing job by searching a preset table stored in the parallel computing system, wherein the preset table is populated prior to determining the number of resources; and distributing the computing job to the determined number of resources.

According to another exemplary embodiment, there is a parallel computing system for reducing an energy consumption when executing a computing job. The parallel computing system includes an input configured to receive a computing job to be performed by the parallel computing system; a scheduler connected to the input and configured to determine a number of resources of plural resources to be used for performing the computing job by searching a preset table, wherein the preset table is populated prior to determining the number of resources; and the plural resources connected to the scheduler and configured to execute the determined computing job.

According to still another exemplary embodiment, there is a computer readable medium for storing computer executable instructions, wherein the instructions, when executed by a parallel computing system, cause the system to reduce an energy consumption in the parallel computing system that includes plural resources. The instructions include receiving a computing job to be performed by the parallel computing system; determining a number of resources of the plural resources to be used for performing the computing job by searching a preset table stored in the parallel computing system, wherein the preset table is populated prior to determining the number of resources; and distributing the computing job to the determined number of resources.

According to another exemplary embodiment, there is a parallel computing system for reducing an energy consumption when executing a computing job. The parallel computing system includes means for receiving a computing job to be performed by the parallel computing system; scheduling means for determining a number of resources of plural resources to be used for performing the computing job by searching a preset table, wherein the preset table is populated prior to determining the number of resources; and the plural resources configured to execute the determined computing job.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of parallel computing systems. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
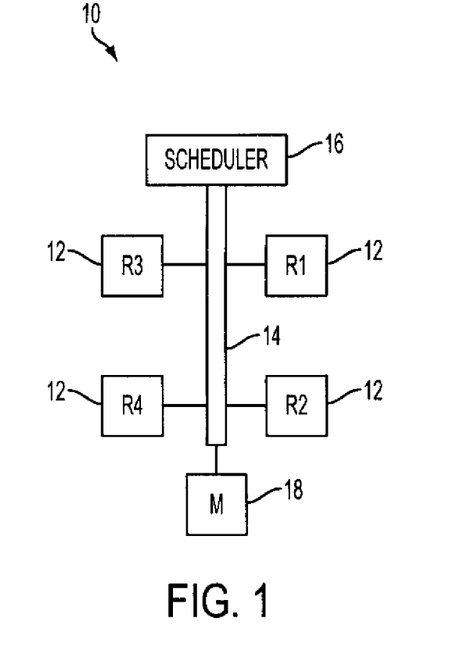
FIG. 1 is a schematic diagram of a parallel computing system.

According to an exemplary embodiment illustrated in FIG. 1, there is a parallel computation system 10 that includes plural resources R1 to R4 12 connected via a bus 14 to a scheduler 16. The scheduler 16 may be a dedicated circuit or may be implemented in one or more of the resources 12. A resource 12 may be a processor, a core, a thread, an application that runs over one or more processors, a Digital Signal Processor (DSP) or an Application Specific Instruction-set Processor (ASIP). A memory M 18 may be linked via the bus 14 to the resources 12 and/or scheduler 16 or may be part of one or all of the resources 12 and/or the scheduler 16.

According to an exemplary embodiment, there is a power-management method for real-time scheduling of a computing job on the resources of a multi-core hardware architecture 10. The method may find, for each process or computing job, an optimum hardware schedule that minimizes the total energy consumption of the system 10. The method may be capable to determine the number of cores or resources to use for each computational job and also to set properties as clock frequency and/or voltage supply for the cores to minimize the energy consumption.

According to an exemplary embodiment, the clock frequency and/or supply voltage of the multi-resource architecture may be controlled individually for each resource. Specific methods for setting supply voltage and frequency on a processor are known by those skilled in the art, see for example Saeed, U.S. Pat. No. 6,711,447 and Rusu et al. U.S. Pat. No. 7,111,178, the disclosures of which are incorporated herein by reference.

Figure 2:
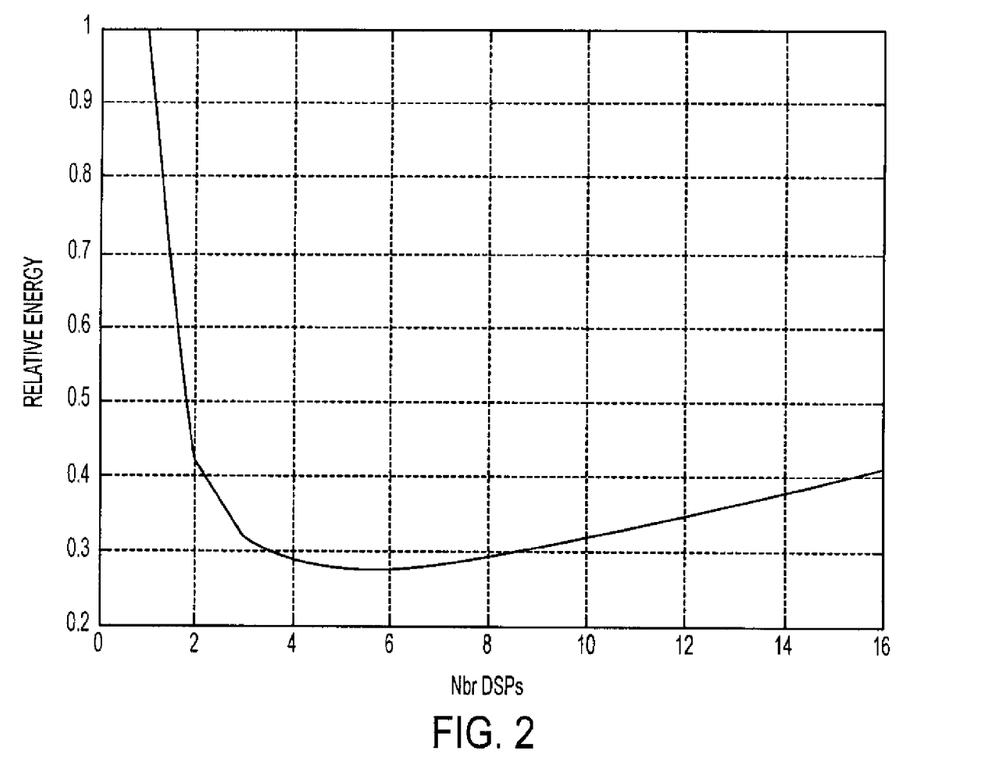
FIG. 2 illustrates a graph displaying an energy consumption of the parallel computing system versus a number of resources used according to an exemplary embodiment.

For a better understanding of the exemplary embodiments, FIG. 2 shows a particular computing job that was performed on a parallel computing system that includes 16 resources. The computing job was performed entirely on only a resource, then entirely on only two resources, then entirely on only three resources and so on until the computing job was performed entirely on all 16 resources. FIG. 2 shows a plot of the energy used for the computing job versus the used number of resources. For this particular computing job, the lowest energy consumption appears to be when five resources are used. However, for other computational jobs, the appropriate number of resources that would minimize the energy consumption may be different.

Figure 3:
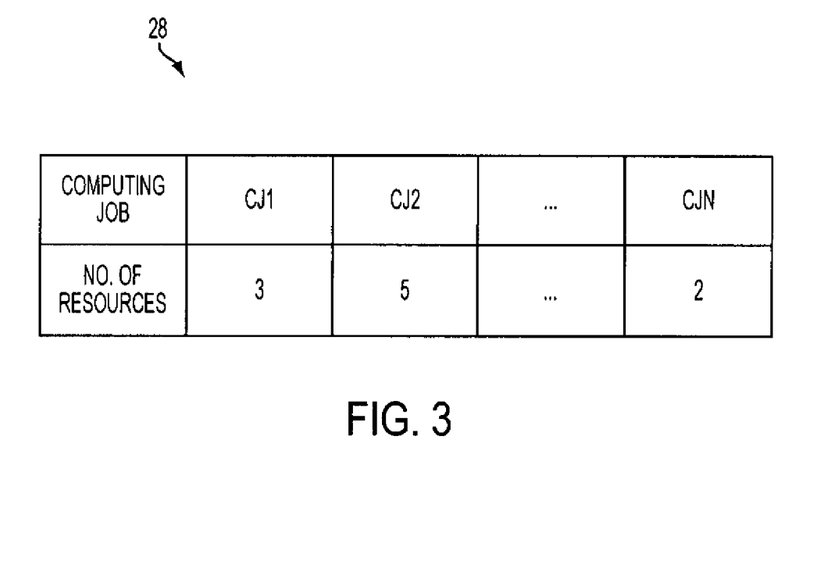
FIG. 3 illustrates is a first preset table that indicates an appropriate number of resources to be used for a given computing job to achieve a low energy consumption according to an exemplary embodiment.

Thus, according to an exemplary embodiment, the scheduler 16 of the parallel computing system 10 shown in FIG. 1 may be programmed, in advance, to distribute a computing job on the number of resources that achieve a reduced (for example, the minimum) energy consumption. In addition, the scheduler may be also programmed to set the clock frequency and/or voltage supply for each resource to achieve the reduced energy consumption. To achieve these advantages, a preset table 28, as shown in FIG. 3, may be defined prior to deciding how many resources should be used.

For a better understanding, the following example is used. However, it is noted that the method may be applied to other situations and is not intended to be limited to this example. Consider that the parallel computing system is implemented in a mobile phone. Suppose that the mobile phone performs only three computing jobs, i.e., supports communications, records files, and runs games. For each one of the three computing jobs, energy computations are used to determine the smallest number of resources that would minimize energy consumption. Thus, based on these experimental runs, the table 28 of FIG. 3 is populated such that for each computing job CJ, the number of resources that minimizes the energy consumption is determined. There are situations when in a real device the computing job to be calculated does not fit a certain preset table. In that situation, a strategy should be determined for dealing with such a case, and two potential strategies are that the method either selects a predetermined small number of resources or uses all the resources to perform the computing job. According to an exemplary embodiment, a computing job is recognized by the parallel computing system based on, for example, calculating a Fast Fourier Transform or decoding a frame of data.

The preset table 28 may be generated and stored, for example, in memory 18, such that the scheduler 16 can easily fetch the appropriate schedule. In this respect, for each computing job there is an optimum number of resources, from an energy consumption perspective, over which each computing job should be distributed. The smallest number of resources may be determined based on a graph similar to that shown in FIG. 2, for each specific computing job. In other words, a graph similar to that shown in FIG. 2 may be determined for each computing job listed in the table 28 of FIG. 3. According to an exemplary embodiment, the graph shown in FIG. 2 does not have to be determined but only the data that is producing that graph as there are computing methods for determining a minimum of a set of data without plotting the set of data.

Once the number of resources to be used for a specific computing job is determined, the voltage and/or frequency to be applied for each resource may be determined. As already noted above, techniques for determining a frequency and/or voltage of each resource of a number of resources when the number of resources is known are available. An exemplary table 30 that stores the frequency and voltage for each set of resources to be used is shown for example in FIG. 4. This table 30 may also be preset and stored in the memory 18 or the scheduler 16.

Thus, according to an exemplary embodiment, when the mobile phone is implemented with the parallel computing system, whenever a specific job has to perform, the scheduler may identify, based on the stored table 28, the number of resources to be used. Then, based on the determined number of resources to be used, the frequency and/or voltage to be applied to each resource may be determined based on table 30. Thus, this operation is quick (because it involves searching one or two tables and not extensive computations) and does not require further computational power.

As those skilled in the art would appreciate, the above discussion regarding the mobile phone is exemplary and the same method may be applied to any computation job that may be run on any parallel computational device.

Still with regard to FIG. 2, the reason for which there is an increase of energy consumption when increasing the number of resources (DSPs in this example) above 5 is twofold. The first reason is that each DSP has a static power consumption due to leakage. For a large number of DSPs, the leakage power becomes dominant, as shown by the right hand side part of the curve shown in FIG. 2. The second reason is that each job has a limited possibility for parallel computation. This means that above a certain number of DSPs, the computing time does not decrease when allocating yet another DSPs. Regarding the computing time, a factor competing with minimizing the energy consumption is a required minimum time for performing the computing job. For example, the parallel computing system may need to execute the computing job in a certain amount of time, as dictated by other considerations. If the number of resources determined based on achieving a low energy consumption would require a larger amount of time for performing the computing job, then the system may ignore achieving the low energy consumption for achieving the time goal, i.e., using more resources than that number that corresponds to the low energy consumption.

For the example shown in FIG. 2, the optimum number of resources is 5, and at least from an energy-perspective, there is no reason to deploy the computing job over more than 5 DSPs. However, due to other concurrent computing jobs, there may be fewer resources available in the system. Therefore, it may be necessary to also define settings for those cases. As a consequence, for the example shown in FIG. 2, it may be necessary to define settings for the case of 1,2,3,4 or 5 available DSPs. An exception is for the case in which the computing job cannot meet its deadline using less than a certain number of DSPs. This case makes unnecessary defining settings for less than the number of DSPs required for meeting the deadline.

According to an exemplary embodiment, the schedule table 30, including clock frequency and/or voltage supply settings for the plural resources, may be calculated both for (i) a case in which all resources have equal properties, and (ii) a case in which the resources have different properties. However, the later case is more complicated than the former case and this later case may include a larger number of possible selections.

Figure 4:
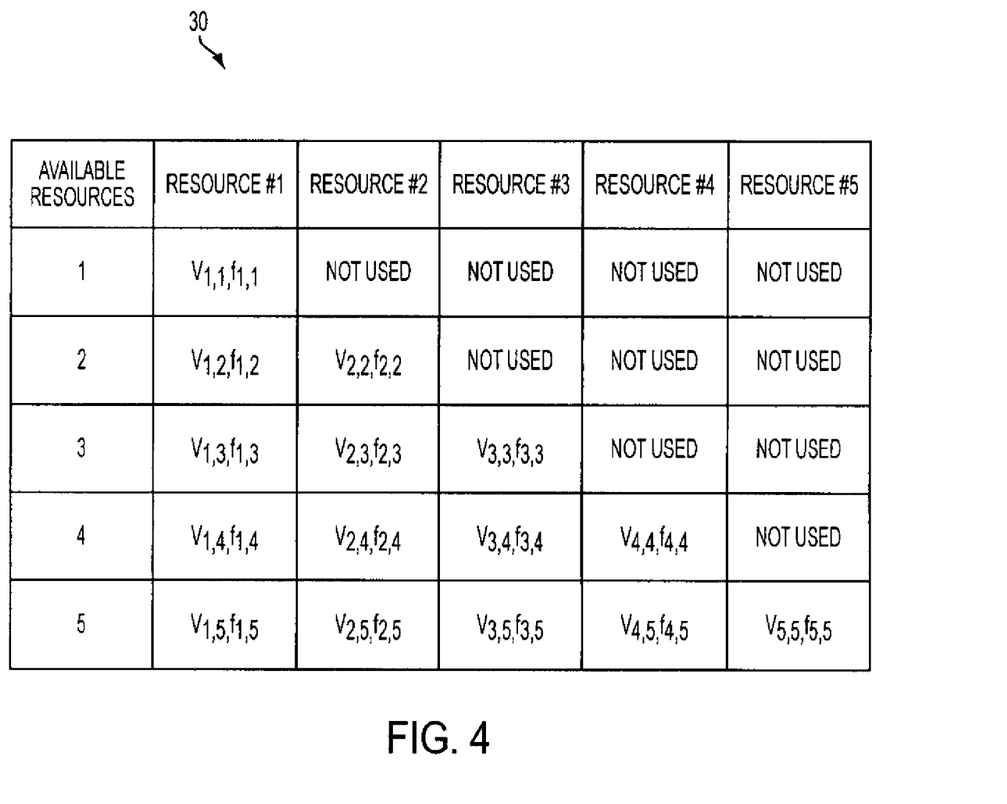
FIG. 4 illustrates a second preset table that indicates for each number of resources an appropriate voltage and frequency to achieve the low energy consumption according to an exemplary embodiment.

An example of the table 30 that illustrates the set of frequency and voltage schedules necessary for the specific computing job illustrated in FIG. 2 is shown in FIG. 4. The voltage supplies and clock frequencies may be lower when more resources are deployed. Thus, the voltages and frequencies shown in the last row of table 30 are generally lower than the voltages and frequencies shown in any of the above rows because the last row of table 30 shows a case when all five resources are used. All the other rows of table 30 show cases when at least one resource is not used. Even if all resources have equal properties, it is not necessary that all frequencies and voltages on each row in table 30 are equal to each other. In one exemplary embodiment, for identical resources, different voltages and frequencies are used.

According to an exemplary embodiment, it might be possible to decide the number of resources and their voltage supplies and frequency selection by calculations in real-time. However, this approach may lead to delays and unnecessary use of resources. Thus, a method as discussed above, which stores the various cases in the memory may be faster.

According to another exemplary embodiment, because the necessary voltage supply levels differ with process variations and operating conditions, further power optimization is possible by calibrating the pre-calculated voltage levels by means of on-chip tests.

According to another exemplary embodiment, when a computing job needs a certain number of resources to finish the job in time, the scheduler would select the row of the table 30 that makes use of that number of resources.

Next, it is discussed a method for determining and selecting the appropriate values from tables 28 and 30 for a given parallel computing system. Suppose that the given system has N resources available. Prior to implementing the tables 28 and 30 into this device, various computing jobs may be run on the first resource, the first two resources, . . . , all N resources in step 400 of FIG. 5. In an exemplary embodiment, the computing jobs are run until the number of resources that use the minimum energy is determined. For example, with reference to FIG. 2, the number of resources that use the minimum energy is 5 and the computing jobs are run up to 5 or 6 resources after which the process is stopped. In FIG. 2 the computing jobs have been run up to 16 resources to generate the graph but, as discussed above, that is not necessary. The first table 28 indicates, for each computing job, the number of resources to be used to achieve a low energy consumption. The number M of resources that achieve the minimum energy consumption (based on a graph similar to that shown in FIG. 2) is selected in step 402 based on the first table 28. Thus, a corollary of this step is to not define settings using more resources than indicated at the minimum energy consumption. This is to make sure that there is no waste of resources or energy by selecting a larger number of resources just because these resources are available.

In step 404 a table containing parameter values for all sets of available resources, which meet timing requirements, is calculated from an energy perspective. The results of this step are illustrated by the table of FIG. 4. It is possible that the calculation step 404 is performed such that only the sets of available resources from the smallest number up to the optimum number of resources is calculated.

Figure 5:
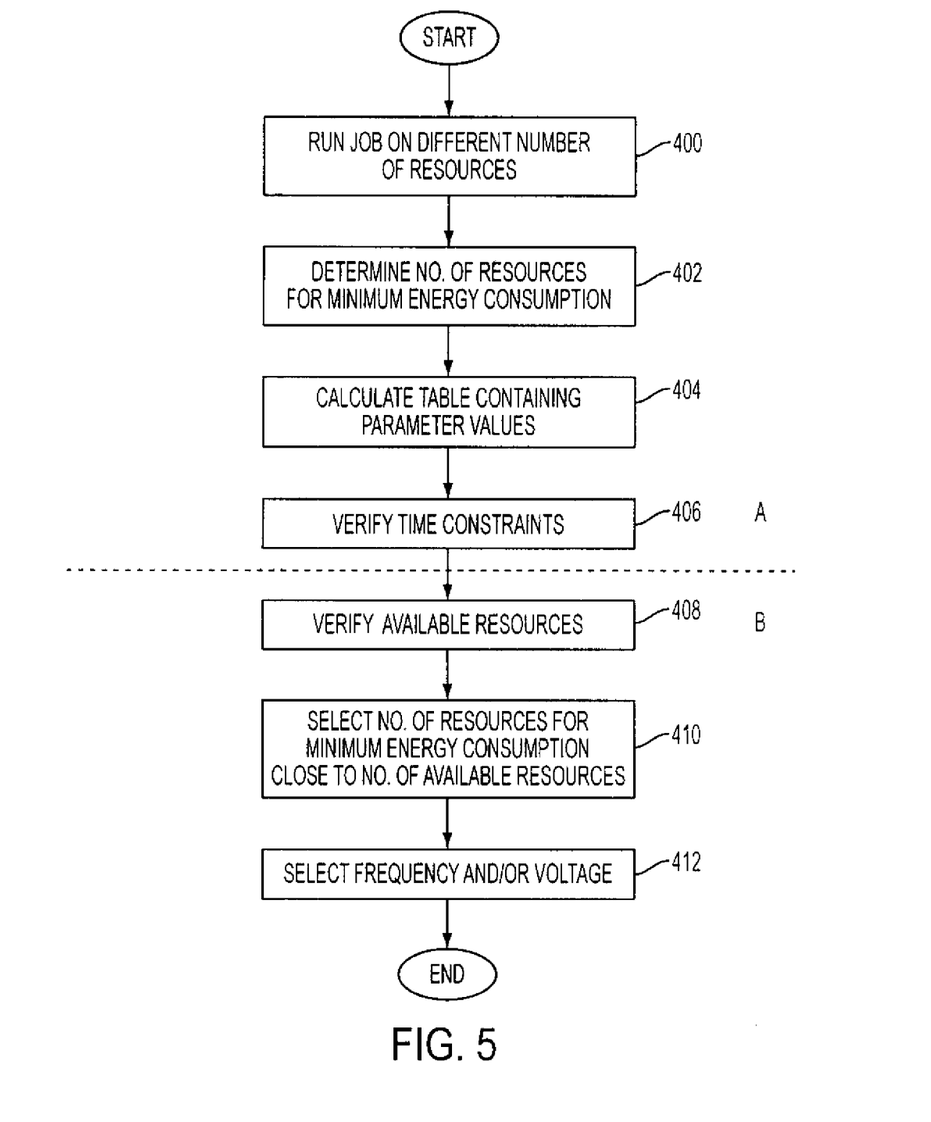
FIG. 5 is a flow chart that illustrates steps for selecting the number of resources and the corresponding frequencies and voltages according to an exemplary embodiment.

An optional step 406 is to verify the time constraints imposed on the system, i.e., if 10 resources are necessary to finish the computing job in a required amount of time and step 402 indicates that an optimal number of resources to be used is 6, from an energy point of view, then advance to step 410 and select 10 resources to calculate the computing job. The above steps 400, 402, 404, and 406 may be performed before receiving a real computing job in the parallel computing system. This is illustrated in FIG. 5 as area A. Area B of FIG. 5 includes steps 408, 410 and 412, which are performed in run-time.

In step 408, the system may verify the number of available resources. Although the system has N resources, at a given time when the system has to perform the computing job, not all N resources may be available. Then, in step 410, the number of resources to be used for the computing job is selected to be (i) identical to the number of resources for minimum energy consumption if this number is smaller or equal to the number of available resources or (ii) the number of available resources if the number of resources for minimum energy consumption is higher than the number of available resources. Once the number of resources has been selected in step 410, the method advances to step 412, in which the frequencies and/or voltages are determined based on the second table 30, shown in FIG. 4. As discussed above with reference to step 406, step 410 may also include the case when the reduction of energy consumption is suspended for calculating in time the computing job.

Other factors that may be incorporated in the mapping of computing jobs to resources and possibly override settings defined in the tables 28 and 30 are temperature considerations, current settings, number of computing jobs waiting to be processes, etc. The temperature may be taken into account in an effort to avoid overheating the same resource, i.e., the same resource should not be used continuously by heavy calculations when other resources are available. The current settings for voltage supply and/or clock frequency for each resource have an impact on the tune-in time and thus, these settings may be taken into consideration to reduce this tune-in time. The number of computing jobs waiting in the queue has to be considered. Thus, for minimizing the processing time of these computing jobs, a predefined number of jobs threshold may be used, which when exceeded, the system is configured to ignore the energy consumption feature and the most number of resources are used. Another consideration is whether the computing job is too small to efficiently be subject to power control due to tune-in times for clock frequency or supply voltage. Then, it might be necessary to merge the small jobs into larger jobs. A decision on the appropriate size of small jobs that need to be taken individually is system dependent.

According to another embodiment, table 30 may also contain a pre-calculated normalized energy figure. By knowing the normalized energy for each schedule case, for each job it is possible to make decisions in case jobs are competing over resources. The combination of resource allocations for competing jobs are then selected to minimize the sum of the energy figures. For example, considering that two different jobs are competing for resources, the normalized energy may be used for deciding how many resources to allocate to each job. In this respect, suppose that table 28 returns N resources for the first job and M resources for the second job and M+N is larger than the number of available resources. Then, the normalized energy may be used to scale down the N and/or M resources such that a sum of the new N and M is not larger than the number of available resources.

According to an exemplary embodiment, the parallel computing device may be configured to achieve a low energy consumption and not necessary the minimum energy consumption. In cases for which the minimum energy consumption may not be achieved, for example, due to time constraints, the system may be configured to select the number of resources that satisfy the time constraint but in the same time is closer to the number of resources for achieving the minimum energy consumption.

Figure 6:
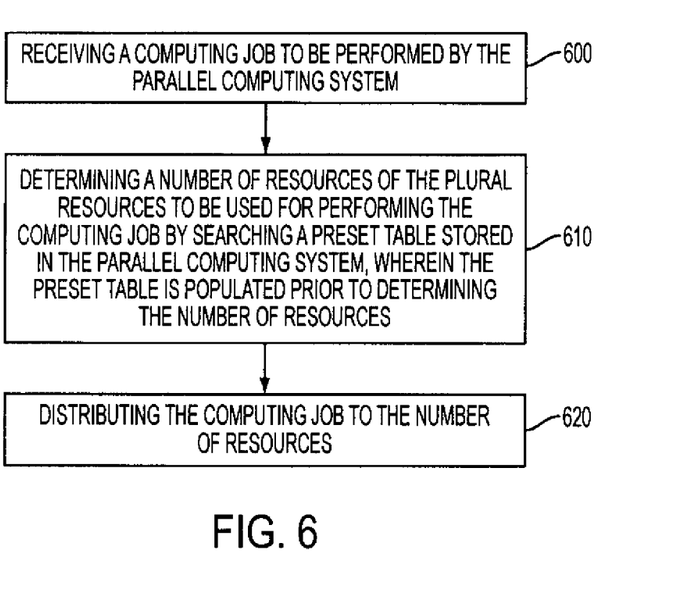
FIG. 6 is a flow chart that illustrates steps for selecting the number of resources according to an exemplary embodiment.

According to an exemplary embodiment, there is a method for reducing an energy consumption in a parallel computing system that includes plural resources, as shown in FIG. 6. The method includes a step 600 of receiving a computing job to be performed by the parallel computing system, a step 602 of determining a number of resources of the plural resources to be used for performing the computing job by searching a preset table stored in the parallel computing system, wherein the preset table is populated prior to determining the number of resources, and a step 604 of distributing the computing job to the determined number of resources.

FIGS. 5 and 6 indicate that the parallel computing system is transformed from a system using a first number of resources for a first computing job to a system using a second number of resources for a second computing job. In other words, the steps illustrated in FIG. 6 have the effect of physically transforming the parallel computing system by adding or removing physical resources for performing a computation job. Along the same line, computer executable instructions stored, for example, in a computer readable medium, which is discussed later, transform, as discussed above, the parallel computing system when these instructions are run by the system.

Energy savings may be substantial when the above discussed exemplary embodiments are implemented in a real parallel computing device. In the example illustrated in FIG. 2, it is possible to reduce the energy consumption by over 70% by selecting the optimum number of resources compared to only one resource. The exemplary embodiments allow this selection to be made without computing intensive energy calculations. One benefit of one or more of the exemplary embodiments is that they provide a simple and fast method to quickly select the number of resources and the appropriate settings for each resource in a multi-resource architecture, without performing extensive calculations.

Figure 7:
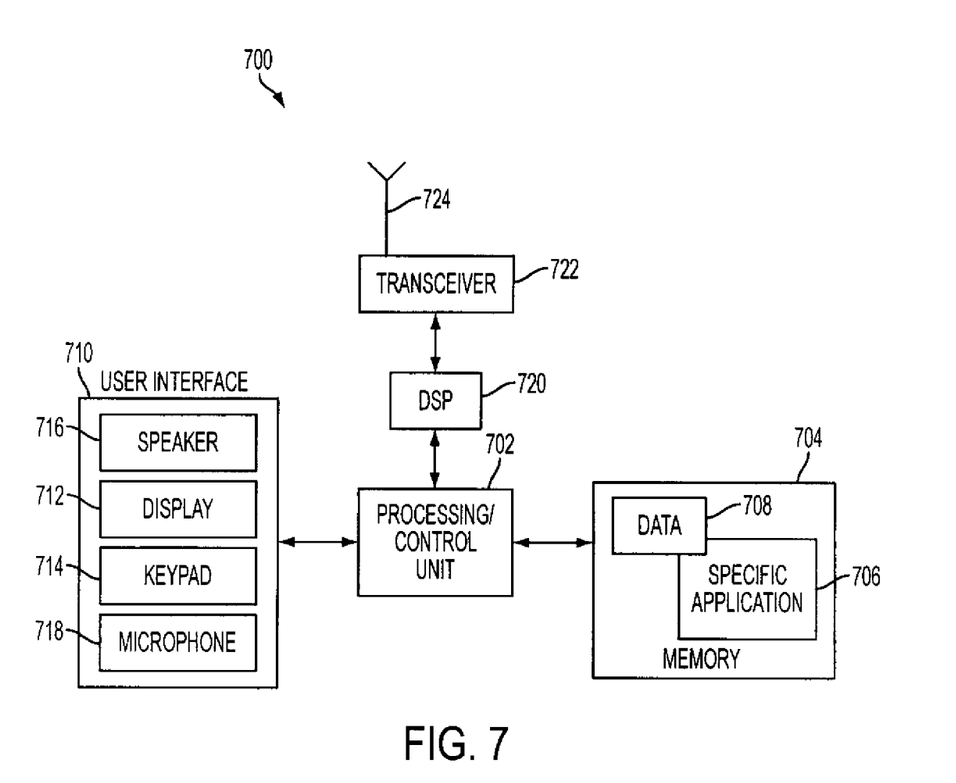
FIG. 7 is a schematic diagram of a parallel computing system according to an exemplary embodiment.

For purposes of illustration and not of limitation, an example of a representative parallel computing system capable of carrying out operations in accordance with the exemplary embodiments is illustrated in FIG. 7. It should be recognized, however, that the principles of the present exemplary embodiments are equally applicable to standard computing systems.

The exemplary parallel computing system 700 may include a processing/control unit 702, such as a microprocessor, reduced instruction set computer (RISC), or other central processing module. The processing unit 702 need not be a single device, and may include one or more processors. For example, the processing unit 702 may include a master processor and associated slave processors coupled to communicate with the master processor. Alternatively, the processing unit 702 may have the structure shown in FIG. 1.

The processing unit 702 may control the basic functions of the system as dictated by programs available in the storage/memory 704. Thus, the processing unit 702 may execute the functions described in FIGS. 5 and 6. More particularly, the storage/memory 704 may include an operating system and program modules for carrying out functions and applications on the parallel computing system. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the parallel computing system 700 via data signals, such as being downloaded electronically via a network, such as the Internet.

One of the programs that may be stored in the storage/memory 704 is a specific program 706. As previously described, the specific program 706 may interact with tables 28 and 30 stored in the memory to determine the appropriate number of resources and/or the frequency and voltage of each resource. The program 706 and associated features may be implemented in software and/or firmware operable by way of the processor 702. The program storage/memory 704 may also be used to store data 708, such as the tables 28 and 30, or other data associated with the present exemplary embodiments. In one exemplary embodiment, the programs 706 and data 708 are stored in non-volatile electrically-erasable, programmable ROM (EEPROM), flash ROM, etc. so that the information is not lost upon power down of the parallel computing system 700.

The processor 702 may also be coupled to user interface 710 elements associated with a mobile terminal. The user interface 710 of the mobile terminal may include, for example, a display 712 such as a liquid crystal display, a keypad 714, speaker 716, and a microphone 718. These and other user interface components are coupled to the processor 702 as is known in the art. The keypad 714 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The parallel computing system 700 may also include a digital signal processor (DSP) 720. The DSP 720 may perform a variety of functions, including analog-to-digital (A/D) conversion, digital-to-analog (D/A) conversion, speech coding/decoding, encryption/decryption, error detection and correction, bit stream translation, filtering, etc. The transceiver 722, generally coupled to an antenna 724, may transmit and receive the radio signals associated with a wireless device.

The parallel computing system 700 of FIG. 7 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 706 and associated features, and data 708, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

The disclosed exemplary embodiments provide a parallel computing system, a method and a computer program product for determining a number of resources to be used for a computing job to minimize energy consumption. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for reducing an energy consumption in a parallel computing system that includes plural resources, the method comprising:
   receiving a computing job to be performed by the parallel computing system;
   determining a number of resources of the plural resources to be used for performing the computing job by selecting, as the number of resources, a number that minimizes the energy consumption when executing the computing job during a required time by searching a preset table stored in the parallel computing system, wherein the preset table is populated prior to determining the number of resources based on running various computing jobs on sets of the plural resources; and
   distributing the computing job to the determined number of resources.

2. The method of claim 1, further comprising:
   searching the preset table stored in the parallel computing system for determining a frequency of each resource to be used for performing the computing job; and
   setting a frequency of each resource of the number of resources based on the preset table.

3. The method of claim 1, further comprising:
setting the number of resources to be smaller than or equal to a number of existing resources when the determined number of resource is larger than the number of existing resources.

4. The method of claim 1, further comprising:
searching the preset table stored in the parallel computing system for determining a voltage of each resource to be used for performing the computing job; and
setting the voltage of each resource of the number of resources based on the preset table.

5. The method of claim 1, further comprising:
dividing the computing job in parts that are independently computed on each of the number of resources.

6. The method of claim 1, further comprising:
setting the number of resources to perform the computing job equal to the minimum number of resources when the determined number of resources based on the preset table is smaller than the minimum number of resources.

7. The method of claim 1, further comprising:
minimizing the energy consumption by using only the determined number of resources for performing the computing job.

8. A parallel computing system for reducing an energy consumption when executing a computing job, the parallel computing system comprising:
an input configured to receive a computing job to be performed by the parallel computing system;
a scheduler connected to the input and configured to determine a number of resources of plural resources to be used for performing the computing job wherein the scheduler is further configured to select as the number of resources, a number that minimizes the energy consumption when executing the computing job during a required time by searching a preset table, wherein the preset table is populated prior to determining the number of resources based on running various computing jobs on set of the plural resources; and
the plural resources connected to the scheduler and configured to execute the determined computing job.

9. The system of claim 8, wherein the scheduler is configured to search the preset table for determining a frequency of each resource to be used for performing the computing job, and to set the frequency of each resource of the number of resources based on the preset table.

10. The system of claim 8, wherein the scheduler is further configured to select the number of resources to be smaller than or equal to a number of existing resources when the determined number of resources is larger than the number of existing resources.

11. The system of claim 8, wherein the scheduler is further configured to search the preset table stored in the parallel computing system for determining a voltage of each resource to be used for performing the computing job, and to set the voltage of each resource of the number of resources based on the preset table.

12. The system of claim 8, wherein the scheduler is further configured to divide the computing job in parts that are independently computed on each of the number of resources.

13. The system of claim 8, wherein the scheduler is further configured to set the number of resources to perform the computing job equal to the minimum number of resources when the determined number of resources based on the preset table is smaller than the minimum number of resources.

14. The system of claim 8, wherein the scheduler is further configured to minimize the energy consumption by using only the determined number of resources for performing the computing job.

15. The system of claim 8, comprising:
a memory connected to the scheduler and configured to store the preset table.

16. The system of claim 15, wherein the preset table includes first and second tables, the first table including a dependence of a computing job to the number of resources and the second table including a dependence of the number of resources to the frequency and/or voltage of each resource.

17. A computer readable medium for non-transitory storing computer executable instructions, wherein the instructions, when executed by a parallel computing system, cause the system to transform from a system using a first number of resources to a system using a second number of resources to reduce an energy consumption in the parallel computing system that includes plural resources, the instructions comprising:
receiving a computing job to be performed by the parallel computing system;
determining a number of resources of the plural resources to be used for performing the computing job by selecting, as the number of resources, a number that minimizes the energy consumption when executing the computing job during a required time by searching a preset table stored in the parallel computing system, wherein the preset table is populated prior to determining the number of resources based on running various computing jobs on sets of the plural resources; and
distributing the computing job to the determined number of resources.

18. The medium of claim 17, further comprising:
searching the preset table stored in the parallel computing system for determining a frequency of each resource to be used for performing the computing job; and
setting a frequency of each resource of the number of resources based on the preset table.

19. The medium of claim 17, further comprising:
selecting the number of resources to be smaller than or equal to a number of existing resources when the determined number of resources is larger than the number of existing resources.

20. The medium of claim 17, further comprising:
searching the preset table stored in the parallel computing system for determining a voltage of each resource to be used for performing the computing job; and
setting the voltage of each resource of the number of resources based on the preset table.

21. The medium of claim 17, further comprising:
dividing the computing job in parts that are independently computed on each of the number of resources.

22. The medium of claim 17, further comprising:
setting the number of resources to perform the computing job equal to the minimum number of resources when the determined number of resources based on the preset table is smaller than the minimum number of resources.

23. The medium of claim 17, further comprising:
minimizing the energy consumption by using only the determined number of resources for performing the computing job.

24. A parallel computing system for reducing an energy consumption when executing a computing job, the parallel computing system comprising:
means for receiving a computing job to be performed by the parallel computing system;

scheduling means for determining a number of resources of plural resources to be used for performing the computing job by selecting as a number of resources, a number that minimizes the energy consumption when executing that computing job during a required time by searching a preset table, wherein the preset table is populated prior to determining the number of resources based on running various computing jobs on sets of the plural resources; and the plural resources configured to execute the determined computing job.

* * * * *